United States Patent
Vincent et al.

[15] 3,697,588
[45] Oct. 10, 1972

[54] CYCLOHEXENYL ACETIC ACID COMPOUNDS

[72] Inventors: Michel Vincent, Bagneux; Georges Remond, Paris; Jean-Claude Poignant, Wissous, all of France

[73] Assignee: Societe en nom collectif Science Union et Cie. Societe Francaise de Recherche Medicale-Suresnes

[22] Filed: Nov. 3, 1969

[21] Appl. No.: 873,659

[30] Foreign Application Priority Data

Nov. 13, 1968  Great Britain..........53,864/68

[52] U.S. Cl......260/514 R, 260/247.2 R, 260/268 R, 260/243.88, 260/468 R, 260/500.5 H, 260/501.1, 260/557 R, 260/586 R, 424/315, 424/316, 424/317, 424/320
[51] Int. Cl. ...C07c 61/28, C07c 103/19, C07c 83/08
[58] Field of Search..............................260/468, 514

[56] References Cited

UNITED STATES PATENTS 3,493,601  2/1970  Shaw et al. ................260/468

*Primary Examiner*—Lorraine A. Weinberger
*Assistant Examiner*—Robert Gerstl
*Attorney*—Cifelli, Behr and Rhodes

[57] ABSTRACT

Cyclohexenyl acetic acid compounds of the formula

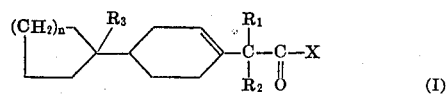

wherein
$R_1$, $R_2$ and $R_3$ are hydrogen or lower alkyl;
$n$ is 1 to 4; and
X is hydroxyl, amino, alkylamino or hydroxylamino.
These compounds possess analgesic and antiinflammatory properties.

3 Claims, No Drawings

CYCLOHEXENYL ACETIC ACID COMPOUNDS

The present invention provides new cyclohexenyl acetic acid compounds of the general formula (I):

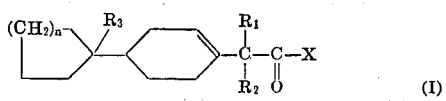

wherein $R_1$, $R_2$ and $R_3$ each represents a hydrogen atom or a lower alkyl radical containing one to five carbon atoms inclusive;

n is an integer from 1 to 4 inclusive; and

X represents a hydroxyl, amino, lower alkylamino, wherein the alkyl moiety has from one to five carbon atoms inclusive, or hydroxyl-amino radical.

The new derivatives of the general formula (I) were prepared by dehydrating a compound of the general formula (II):

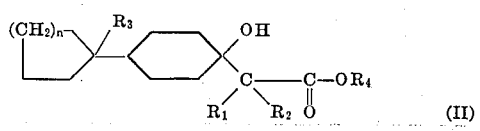

in which $R_1$, $R_2$ and $R_3$ have the meanings defined above and $R_4$ represents a lower alkyl radical containing one to five carbon atoms inclusive;

and by reacting the so-obtained compound of the general formula (III):

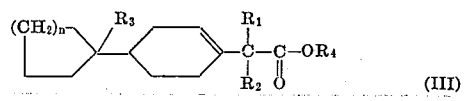

in which $R_1$, $R_2$, $R_3$ and $R_4$ have the meanings defined above, with a compound of the general formula (IV):

$$HX \qquad (IV)$$

in which X has the meanings defined above.

The derivatives of the general formula (II) are dehydrated by a method known per se, such for example, as the method described by G.A.R. Kon and K.S. Nargund, J. Chem. Soc. 2461 (1932).

The derivatives of the general formula (II) themselves are prepared according to the Reformatsky reaction from 4-cycloalkyl cyclohexanone, prepared according to the method of A.R. Pinder, J. Chem. Soc. 1577 (1956), of the general formula

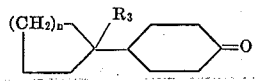

and from α-bromoester of the general formula

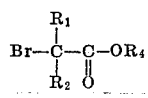

in which $R_1$, $R_2$, $R_3$ and $R_4$ have the meanings defined above.

The new derivatives of the general formula (I), in which X is a hydroxyl or hydroxylamino radical, can be transformed into addition salts with mineral or organic bases, such for example, as bases of alkaline or alkaline earth metals, primary, secondary and tertiary amines, such as mono-, di- and triethylamines, and heterocyclic bases such, for example, as morpholine, piperazine, piperidine, etc... The present invention also provides these salts.

All the derivatives of the present invention contain at least one asymmetric carbon atom and thus may be resolved in optical isomers by methods known per se. The optical isomers of the derivatives of the general formula (I) are also included in the present invention.

The following Examples illustrate the invention:

EXAMPLE 1

(4-cyclohexyl-1-cyclohexen-1-yl) acetic acid

A solution of 6.1 g (0.024 mol.) of ethyl (4-cyclohexyl-1-cyclohexen-1-yl) acetate, B.P. 0.05 mm Hg: 124°–125° C, prepared according to the methods of Reformatsky and G.A.R. Kon and K.S. Nargund, J. Chem. Soc. 2461 (1932), in 268 ml of N-sodium hydroxide solution and 386 ml of ethanol, is heated at reflux for 4 hours.

After concentration to dryness, the residue is dissolved into distilled water and the unsaponifiable products are extracted with ether. The aqueous layer is acidified until $pH_1$ with 5 N - HCl, and the precipitated acid is taken out with ether. The ethered solution is washed with distilled water, dried on calcium sulphate, filtrated and concentrated to dryness. The crystalline residue is recrystallized from 250 ml of pentane. 3.3 g of (4-cyclohexyl-1-cyclohexen-1-yl) acetic acid, M.P. (capillary) 100°–101° C, are obtained, yield: 61.2 percent.

EXAMPLES 2 to 9

The following derivatives are prepared according to the method described in Example 1:

2. α-(4-cyclohexyl-1cyclohexen1-yl) propionic acid,

M.P. capillary: 55°–57° C, starting from ethyl α-(4-cyclohexyl-1-cyclohexen-1-yl) propionate, B.P. 0.01 mm Hg: 114°–118° C, yield: 72.3 percent, itself prepared from ethyl α-(1-hydroxy-4-cyclo-hexyl cyclohexyl) propionate, B.P. 0.03 mm Hg: 124°–126° C, yield: 75.8 percent, itself prepared from 4-cyclohexyl cyclohexanone and ethyl α-bromopropionate, yield: 66.8 percent.

3. α-(4-cyclohexyl-1-cyclohexen-1-yl) butyric acid,

M.P. (capillary): 83°–85° C, starting from ethyl α-(4-cyclohexyl-1-cyclohexen-1-yl) butyrate, B.P. 0.03 mm Hg: 120°–124° C, yield: 55.9 percent, itself prepared from ethyl α-(1-hydroxy-4-cyclohexyl cyclohexyl) butyrate, B.P. 0.01 mm Hg: 148°–152° C, yield: 71.4 percent, itself prepared from 4-cyclohexyl cyclohexanone and ethyl α-bromobutyrate, yield: 59.4 percent.

4. α-(4-cyclohexyl-1-cyclohexen-1-yl) isobutyric acid,

M.P. (Kofler) 141°–142° C, starting from ethyl α-(4-cyclohexyl-1-cyclohexen-1-yl) isobutyrate, B.P. 0.05 mm Hg: 120°–122° C, yield: 47 percent, itself prepared from ethyl α-(1-hydroxy-4-cyclohexyl-cyclohexyl) isobutyrate, B.P. 0.05 mm Hg: 128°–132° C, yield: 61.9 percent, itself prepared from 4-cyclohexyl cyclohexanone and ethyl α-bromo isobutyrate, yield: 62.2 percent.

The sodium α-(4-cyclohexyl-1-cyclohexen-1-yl) isobutyrate, M.P. (Kofler): 141°–142° C, was prepared from α-(4-cyclohexyl-1-cyclohexen-1-yl) isobutyric acid previously obtained, yield: 74 percent.

5. α-[4-(1-methyl-cyclohexyl)-1-cyclohexen-1-yl] propionic acid,

M.P. (capillary): 70°–74° C, starting from ethyl α-[4-(1-methyl-cyclohexyl)-1-cyclohexen-1-yl] propionate, B.P. 0.07 mm Hg: 129°–130° C, yield: 35 percent, itself prepared from ethyl α-[1-hydroxy-4-(1-methyl-cyclohexyl) cyclohexyl] propionate, B.P. 0.02 mm Hg: 134°–136° C, yield: 60.7 percent, itself prepared from 4-(1-methyl-cyclo-hexyl) cyclohexanone and ethyl α-bromopropionate, yield: 66.5 percent.

6. α-[4-(1-methyl-cyclopentyl)-1-cyclohexen-1-yl] propionic acid,

M.P. (capillary): 68°–70° C, starting from ethyl α-[4-(1-methyl-cyclopentyl)-1-cyclohexen-1-yl] propionate, B.P. 0.07 mm Hg: 120°–122° C, yield: 72.8 percent, itself prepared from ethyl α-[1-hydroxy-4-(1-methyl-cyclopentyl) cyclohexyl] propionate, B.P. 0.05 mm Hg: 120°–124° C, yield: 74 percent, itself prepared from 4-(1-methyl-cyclopentyl) cyclohexanone and ethyl α-bromopropionate, yield: 74.6 percent.

7. α[4-(1-butyl-cyclopentyl)-1-cyclohexen-1-yl] propionic acid, starting from ethyl α-[4-(1-butyl-cyclopentyl)-1-cyclohexen-1-yl] propionate, itself prepared from ethyl α-[1-hydroxy-4-(1-butyl-cyclopentyl) cyclohexyl] propionate, itself prepared from 4-(1-butyl-cyclopentyl) cyclohexanone and ethyl α-bromopropionate.

8. α-[4-(1-ethyl-cycloheptyl)-1-cyclohexen-1-yl] propionic acid, starting from ethyl α-[4-(1-ethyl-cycloheptyl)-1-cyclohexen-1-yl] propionate, itself prepared from ethyl α-[1-hydroxy-4-(1-ethylcycloheptyl) cyclohexyl] propionate, itself prepared from 4-(1-ethyl-cycloheptyl) cyclohexanone and ethyl α-bromopropionate.

9. α-(4-cyclooctyl-1-cyclohexen-1-yl) butyric acid, starting from ethyl α-(4-cyclooctyl-1-cyclohexen-1-yl) butyrate, itself prepared from ethyl α-(1-hydroxy-4-cyclooctyl cyclohexyl) butyrate, itself prepared from 4-cyclooctyl cyclohexanone and ethyl α-bromobutyrate.

EXAMPLE 10

(4-cyclohexyl-1-cyclohexen-1-yl) acetohydroxamic acid

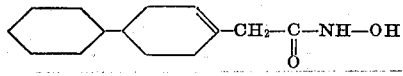

A hydroxylamine solution was prepared starting from 9.25 g (0.13 mol.) of hydroxylamine hydrochloride and 3.17 g (0.13 atom-gramme) of sodium in 60 ml of ethanol. The sodium chloride formed was filtrated and 22 g (0.088 mol.) of ethyl (4-cyclohexyl-1-cyclohexen-1-yl) acetate and a solution of sodium ethylate (prepared starting from 2 g (0.088 atom-gramme) of sodium in 51 ml of ethanol) were added to the filtrate while stirring and maintaining the temperature within the range of from 0° to +5° C. The mixture was then allowed to stand for 48 hours at room temperature, and concentrated to dryness.

The residue was dissolved in 1,500 ml of water and the solution acidified by hydrochloric acid until pH₁.

(4-cyclohexyl-1-cyclohexen-1-yl) acetohydroxamic acid was suctioned off, washed with distilled water, dried and crystallized in a water-ethanol solution. M.P. (capillary): 165°–168° C, with decomposition, yield: 52.4 percent.

EXAMPLES 11 to 12

The following derivatives were prepared according to the method described in Example 10.

11. α-(4-cyclohexyl-1-cyclohexen-1-yl) propionohydroxamic acid,

M.P. (Kofler Bank): 150°–153° C, with decomposition (benzene), starting from ethyl α-(4-cyclohexyl-1-cyclohexen-1-yl) propionate, yield: 49.8 percent.

12. α-(4-cyclohexyl-1-cyclohexen-1-yl) butyrohydroxamic acid,

M.P. (capillary): 122°–125° C, with decomposition (pentane), starting from ethyl α-(4-cyclohexyl-1-cyclohexen-1-yl) butyrate, yield: 84 percent.

EXAMPLE 13

α-(4-cyclohexyl-1-cyclohexen-1-yl) propionamide

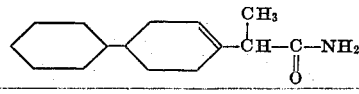

M.P. (Kofler): 140°–141° C (cyclohexane), starting from ethyl α-(4-cyclohexyl-1-cyclohexen-1-yl) propionate and an ammoniacal solution, yield: 50 percent.

EXAMPLE 14

N-ethyl α-(4-cyclohexyl-1-cyclohexen-1-yl) propionamide

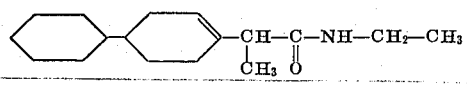

M.P. (capillary): 101°–102° C (pentane/cyclohexane), starting from ethyl α-(4-cyclohexyl-1-cyclohexen-1-yl) propionate and monoethylamine, yield: 31.6 percent.

The cyclohexenyl acetic acid derivatives and their physiologically tolerable salts of the present invention are valuable pharmaceutical products having especially analgesic and antiinflammatory properties.

The toxicity studied in mice showed that their $LD_{50}$ varies from 150 to 300 mg/kg by the intraperitoneal route and from 750 to 2,000 mg/kg by the oral route.

The antiinflammatory activity was demonstrated according to the method of C.H. Winter et al. (Proc. Soc. Exp. Biol. Med. 3, 544 (1962). It was observed that the new compounds administered at doses of 40 to 80 mg/kg P.O., decrease from 19 to 58 percent the plantar oedema of the rat's paw induced by carrageenine.

The analgesic activity was studied in rats by the method of L.O. Randall and J.J. Sellito (Arch. Internat. Pharmacodyn. *lll*, 409 (1957). It was noted that the new derivatives administered at doses of 40 to 80 mg/kg P.O., increase the threshold of pain-perception from 16 to 137 percent.

The invention further includes pharmaceutical preparations containing a derivative of the general formula (I) or a physiologically tolerable salt thereof in admixture or conjunction with a pharmaceutically suitable carrier such, for example, as distilled water, glucose, lactose, talc, starch, cocoa butter, etc. The pharmaceutical forms may be: tablets, dragees, capsules, suppositories or solutions for oral, rectal or parenteral administration at doses from 50 to 500 mg, one to five times per day.

We claim:

1. A compound selected from the group consisting of (A) - cyclohexenyl acetic acid compounds of the general formula (I):

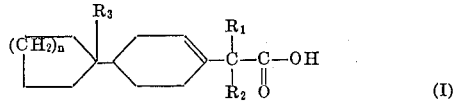

(I)

wherein:

$R_1$, $R_2$ and $R_3$ are selected from hydrogen and lower alkyl containing from one to five carbon atoms inclusive:

$n$ is an integer from 1 to 4 inclusive; and (B) - physiologically acceptable addition salts of the compounds of the general formula (I), with mineral or organic bases suitable for forming said salts.

2. A compound of claim 1 which is $\alpha$-(4-cyclohexyl-1-cyclohexen-1-yl) propionic acid.

3. A compound of claim 1 which is $\alpha$-[4-(1-methylcyclopentyl)-1-cyclohexen-1-yl] propionic acid.

* * * * *

UNITED STATES PATENT OFFICE
CERTIFICATE OF CORRECTION

Patent No. 3,697,588    Dated October 10, 1972

Inventor(s) Michel Vincent, Georges Remond, Jean-Claude Poignant

It is certified that error appears in the above-identified patent and that said Letters Patent are hereby corrected as shown below:

Column 2, line 31, delete "$pH_1$", insert --pH 1--.

Column 4, line 2, delete "$pH_1$", insert --pH 1--.
line 64, delete "Italic 111", insert --111-- as in one hundred and eleven.

Column 6, line 6, delete "(B)- "
line 7, before the word "physiologically", insert --(B)--.

Signed and sealed this 7th day of January 1975.

(SEAL)
Attest:

McCOY M. GIBSON JR.
Attesting Officer

C. MARSHALL DANN
Commissioner of Patents